(12) United States Patent
Kim

(10) Patent No.: US 11,047,473 B2
(45) Date of Patent: Jun. 29, 2021

(54) APPARATUS AND METHOD FOR CONTROLLING STARTING OF VEHICLE ENGINE

(71) Applicants: Hyundai Motor Company, Seoul (KR); Kia Motors Corporation, Seoul (KR)

(72) Inventor: Seungbum Kim, Seongnam-si (KR)

(73) Assignees: Hyundai Motor Gompany, Seoul (KR); Kia Motors Corporation, Seoul (KR)

( * ) Notice: Subject to any disclaimer, the term of this patent is extended or adjusted under 35 U.S.C. 154(b) by 51 days.

(21) Appl. No.: 16/694,245

(22) Filed: Nov. 25, 2019

(65) Prior Publication Data

US 2020/0355261 A1 Nov. 12, 2020

(30) Foreign Application Priority Data

May 8, 2019 (KR) .......................... 10-2019-0053603

(51) Int. Cl.
*B60W 30/18* (2012.01)
*F16H 59/18* (2006.01)
*B60W 20/40* (2016.01)
*B60W 10/02* (2006.01)
*F16H 61/00* (2006.01)
*F02P 5/04* (2006.01)

(52) U.S. Cl.
CPC .............. *F16H 59/18* (2013.01); *B60W 10/02* (2013.01); *B60W 20/40* (2013.01); *F16H 61/0006* (2013.01); *B60W 30/18072* (2013.01); *F02P 5/045* (2013.01); *F16H 2059/186* (2013.01)

(58) Field of Classification Search
CPC .... F16H 2059/186; F16H 59/18; F16H 59/56; F16H 63/50; B60W 10/02; B60W 10/06; B60W 20/40; B60W 30/18072; B60W 30/192; B60W 2030/1809; B60W 2510/0208; B60W 2540/06; B60W 2540/103; B60W 2540/14; B60W 2710/06
See application file for complete search history.

(56) References Cited

U.S. PATENT DOCUMENTS 5,265,018 A * 11/1993 Sokol .................... B60W 10/10
192/32
5,667,458 A * 9/1997 Narita ................... F16H 61/143
477/118

(Continued)

*Primary Examiner* — Edwin A Young
(74) *Attorney, Agent, or Firm* — Morgan, Lewis & Bockius LLP

(57) ABSTRACT

An apparatus configured for controlling starting of engine may include a clutch pedal including an ignition lock switch, a starter, a status detecting unit, an electronic clutch mounted between the engine and a transmission, a clutch controller configured to control coupling and releasing of the electronic clutch, check status of the electronic clutch and generate a clutch status data, and a vehicle controller configured to enter coasting running mode based on the vehicle status data, and, during the coasting running mode, operate the starter and restart the engine based on the clutch status data provided from the clutch controller and a switch status data of the ignition lock switch when a position value of an acceleration pedal included in the vehicle status data is equal to or greater than an acceleration reference value.

12 Claims, 3 Drawing Sheets

(56) References Cited

U.S. PATENT DOCUMENTS

| | | | |
|---|---|---|---|
| 8,663,067 B2 * | 3/2014 | Mair | B60W 10/02 477/80 |
| 2013/0325273 A1 * | 12/2013 | Reuter | B60W 30/00 701/54 |
| 2019/0323471 A1 * | 10/2019 | Henson | F02N 11/04 |

* cited by examiner

APPARATUS AND METHOD FOR CONTROLLING STARTING OF VEHICLE ENGINE

CROSS-REFERENCE TO RELATED APPLICATION

The present application claims priority to Korean Patent Application No. 10-2019-0053603 filed on May 8, 2019, the entire contents of which is incorporated herein for all purposes by this reference.

BACKGROUND OF THE INVENTION

Field of the Invention

The present invention is related to an apparatus and a method for controlling starting of vehicle engine, more particularly, related to an apparatus and a method for controlling starting of vehicle engine capable of controlling restarting of the engine with electronic clutch mounted between the engine and a transmission.

Description of Related Art

A power transmission apparatus of a vehicle is an apparatus configured for transmitting power generated by an engine to a driving wheel. Such a power transmission apparatus may be classified into a manual transmission and an automatic transmission.

A manual transmission represents a transmission which is been controlled by driver through a shift lever to change transmission stages according to vehicle speed and rotation rate of the engine. On the other hand, an automatic transmission represents a transmission that automatically changes transmission stages according to vehicle speed, opening rate of throttle valve, etc.

Recently, Worldwide Harmonized Light Vehicle Test Procedure (WLTP) and Real Driving Emission (RDE) are being implemented as a regulation on the exhaust gas test of diesel engine vehicles, replacing conventional regulations such as New European Driving Cycle (NEDC). Accordingly, in Europe, the WLTP and the RDE have been implemented from Sep. 1, 2017, and in Korea, they have been implemented from Sep. 1, 2018.

Accordingly, vehicle manufacturers are working on a variety of research and development to reduce $CO_2$ emissions and improve fuel efficiency in manual transmission vehicles.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an apparatus configured for controlling starting of engine which may include a clutch pedal including an ignition lock switch, a starter, a status detecting unit, an electronic clutch mounted between the engine and a transmission, a clutch controller configured to control coupling and releasing of the electronic clutch, check status of the electronic clutch and generate a clutch status data, and a vehicle controller configured to enter coasting running mode based on the vehicle status data, and, during the coasting running mode, operate the starter and restart the engine based on the clutch status data provided from the clutch controller and a switch status data of the ignition lock switch when a position value of an acceleration pedal included in the vehicle status data is equal to or greater than an acceleration reference value.

The vehicle controller may be configured to, during the coasting running mode, operate the starter to restart the engine when the clutch status data is 'release' and the switch status data is 'on'.

The vehicle controller may be configured to, during the coasting running mode, determine a status determination on the ignition lock switch to be abnormal when the clutch status data is 'release' and the switch status data is 'off'.

The vehicle controller may be configured to determine a status determination of the electronic clutch to be abnormal when the clutch status data is 'coupled' and the switch status data is on.

The vehicle controller may be configured to, during the coasting running mode, control an output unit to output an alert notice data when the clutch status data is 'coupled' and the switch status data is 'off'.

The vehicle controller may be configured to, during the coasting running mode, determine a status determination on the ignition lock switch to be abnormal when the clutch status data is 'coupled' and the switch status data is 'off'.

Furthermore, a method for controlling starting of engine of a vehicle including a clutch pedal including an ignition lock switch, a starter configured to start an engine, and an electronic clutch mounted between the engine and a transmission may include detecting, by a status detecting unit, a vehicle status data for controlling starting of the engine, entering, by a vehicle controller, into a coasting running mode based on the vehicle status data, determining, by the vehicle controller, whether a position value of an accelerator pedal is equal to or greater than an acceleration reference value during the coasting running mode, when the position value of the acceleration pedal is equal to or greater than the acceleration value, determining, by the vehicle controller, whether a clutch status data of the electronic clutch is 'released', when the clutch status data is 'released', determining, by the vehicle controller, whether a switch status data of the ignition lock switch is 'on', and when the switch status data is 'on', operating, by the vehicle controller, the starter to restart the engine.

Furthermore, effects which may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
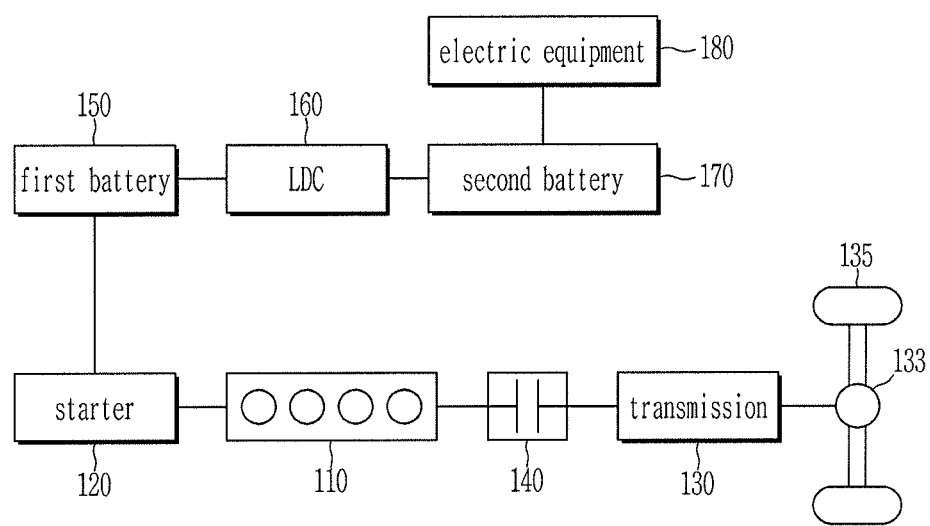
FIG. 1 is a block diagram illustrating a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an apparatus and a method for controlling starting of engine according to an exemplary embodiment of the present invention is described in detail with reference to the drawings. However, the drawings to be described below and the following detailed description relate to an exemplary embodiment of various exemplary embodiments for effectively explaining the characteristics of the present invention. Therefore, the present invention may not be construed as being limited to the drawings and the following description.

Furthermore, in the description of exemplary embodiments of the present invention, the detailed description of related well-known configurations and functions is not provided when it is determined as unnecessarily making the scope of the present invention unclear. Furthermore, the terminologies to be described below are ones defined in consideration of their function in an exemplary embodiment of the present invention and may be changed by the intention of a user, an operator, or a custom. Therefore, their definition may be made on the basis of the description of the present invention.

Furthermore, in the following exemplary embodiments of the present invention, the terminologies are appropriately changed, combined, or divided so that those skilled in the art can clearly understand them, to efficiently explain the main technical characteristics of the present invention, but the present invention is not limited thereto.

Hereinafter, various exemplary embodiments of the present invention will be described in detail with reference to the accompanying drawings.

FIG. 1 is a block diagram illustrating a vehicle according to an exemplary embodiment of the present invention.

Referring to FIG. 1, a vehicle according to an exemplary embodiment of the present invention may include an engine 110, a starter 120, a transmission 130, a differential gear apparatus 133, a drive-wheel 135, an electronic clutch 140, a first battery 150, a LDC (Low voltage DC-DC Converter, 160), a second battery 170 and an electronic equipment 180.

The engine 110 generates a drive torque by combustion of a fuel. That is, the engine 110 transforms a chemical energy of the fuel to a mechanical energy, by combustion of the fuel with the air. The engine 110 may generate combust torque by controlling ignition timing, air volume, fuel amount and air/fuel ratio.

In the vehicle's power delivery, torque from the engine 110 is transmitted to the input shaft of the transmission 130, and a torque output from the output shaft of the transmission 130 is transmitted to an axle via the differential gear apparatus 133. As the axle rotates drive-wheel 135, the vehicle is driven by the torque generated by the engine 110.

The starter 120 starts the engine 110. The starter 120 may be directly connected to a crankshaft of the engine 110 to start the engine 110.

The transmission 130 transfers torque from the engine 110 to the drive-wheel 135, allowing the vehicle to run. This transmission 130 may be a manual transmission (MT).

Transmission 130 is shifted by a driver's manipulation of stepping on a clutch pedal 210 and moving a gear lever to a desired gear stage. The transmission 130 converts the output torque of the engine 110 into a corresponding transmission ratio according to the operation of the gear lever of the driver and outputs a driving torque to the differential gear apparatus 133.

The electronic clutch 140 is mounted between the engine 110 and the transmission 130. The electronic clutch 140 engages or disengages and transmits the engine 110's torque to the drive-wheel 135 or not. That is, when the electronic clutch 140 is engaged, the driveshaft of the engine 110 and the driveshaft of the transmission 130 are connected to each other to transmit the torque of the engine 110 to the drive-wheel 135. When the electronic clutch 140 is released, the driveshaft of the engine 110 and the driveshaft of the transmission 130 are not connected together so that the torque of the engine 110 is not transmitted to the drive-wheel 135.

The first battery 150 supplies the starter 120 with electric power. The first battery 150 is a high voltage battery (e.g., 48 V battery) and may be called a main battery.

For example, the first battery 150 may be a lithium-ion battery. Such a lithium-ion battery has fast charge and discharge speed and good durability, but may have low energy storage performance and charge/discharge efficiency at an extremely low temperature.

The LDC 160 charges the second battery 170 by converting the voltage (e.g., 48 V) supplied from the first battery 150 to a low voltage (e.g., 12 V).

The second battery 170 may be charged through electric power supplied from the LDC 160.

The second battery 170 is a low voltage battery (e.g., a 12 V battery) and may be referred to as an auxiliary battery.

For example, the second battery 170 may be an absolute glass mat (AGM) battery or a lead-acid battery.

The second battery 170 supplies electric power to the electronic equipment 180 using low voltage (e.g., 12 V).

The electronic equipment 180 represents a component driven by the second battery 170 in the vehicle. For example, the electronic equipment 180 may include an air conditioner, a head lamp, a wiper, a fog lamp, a sunroof, and the like.

Figure 2:
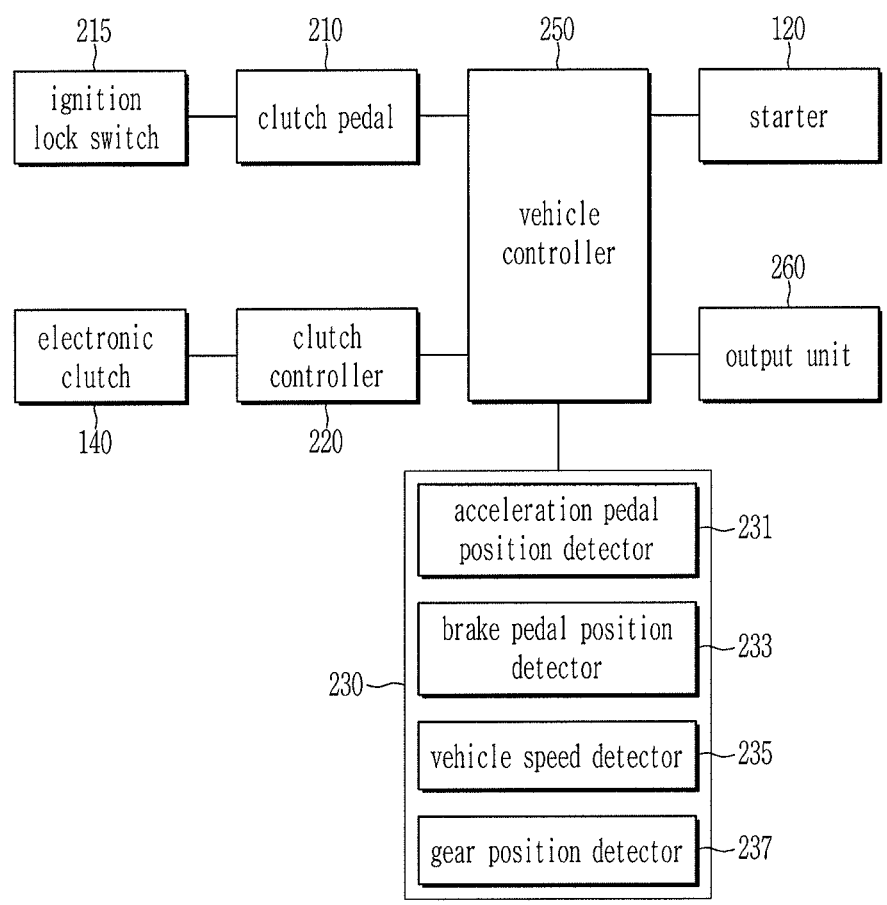
FIG. 2 is a block diagram illustrating an apparatus configured for controlling starting of engine according to an exemplary embodiment of the present invention.

FIG. 2 is a block diagram illustrating an apparatus of controlling starting of engine according to an exemplary embodiment of the present invention.

Referring to FIG. 2, the engine starting control apparatus of the vehicle may include a clutch pedal 210, a clutch controller 220, a status detecting unit 230, a vehicle controller 250 and an output unit 260.

The clutch pedal 210 includes an ignition lock switch 215 for starting when the pedal is pressed.

The Ignition lock switch 215 prevents starting when the clutch pedal 210 is not depressed. The Ignition lock switch 215 stays off when they are idle without stepping on the clutch pedal 210, and then comes on when the clutch pedal 210 is rotated at an angle by stepping on the clutch pedal 210. That is, the Ignition lock switch 215 is turned on when the clutch pedal 210 is depressed more than a predetermined value, separately from the depression switch of the clutch pedal 210. In the present way, when the ignition lock switch 215 is on, the vehicle may be started without locking the ignition.

The clutch controller 220 may control an operation of the electronic clutch 140. That is, the clutch controller 220 controls the engagement and release of the electronic clutch 140 to control power delivery of the engine 110.

The clutch controller 220 is connected to the vehicle controller 250 via a vehicle communication network. Here, the vehicle communication network may be a controller area network (CAN), a flex ray (FlexRay), a media oriented systems transport (MOST), a local interconnect network (LIN), or the like.

The clutch controller 220 checks the status of the electronic clutch 140 and generates clutch status data. The clutch controller 220 provides the clutch status data to the vehicle controller 250.

The status detecting unit 230 detects vehicle status data to control engine starting of the vehicle. The status detecting unit 230 includes an accelerator pedal position sensor 231, a brake pedal position sensor 233, a vehicle speed sensor 235 and a gear position sensor 237.

Furthermore, the status detecting unit 230 may further include a sensor (e.g., a state of charge (SOC) sensor of the battery, an engine speed sensor, etc.) for controlling the vehicle.

The accelerator pedal position sensor 231 detects how much a driver presses the accelerator pedal. That is, the accelerator pedal position sensor 231 measures the position value of the accelerator pedal (degree of pressing the accelerator pedal) and transmits s corresponding signal to the vehicle controller 250.

If the accelerator pedal is fully pressed, the position of the accelerator pedal may be 100%, and if the accelerator pedal is not pressed, the position of the accelerator pedal may be 0%.

Instead of using the accelerator pedal position sensor 231, a sensor for detecting throttle valve opening in the intake passage may also be used. Therefore, in the exemplary embodiment and claims, the accelerator pedal position sensor 231 may be regarded as including a sensor for detecting throttle valve opening.

The brake pedal position sensor 233 detects how much a driver presses a brake pedal. That is, the brake pedal position sensor 233 measures a position value of the brake pedal (how much the brake pedal is pressed) and transmits a corresponding signal to the vehicle controller 250.

If the brake pedal is fully pressed, the position of the brake pedal may be 100% and if the brake pedal is not pressed, the position of the brake pedal may be 0%.

The vehicle speed sensor 235 detects speed of the vehicle and may be mounted on the drive-wheel 135 of the vehicle. Meanwhile, when the vehicle speed sensor 235 is not provided, the vehicle controller 250 may determine the vehicle speed using a Global Positioning System (GPS) signal received from the GPS.

The gear position sensor 237 detects the current position of a shift lever. The gear position sensor 237 transmits the detected gear position to the vehicle controller 250.

The vehicle controller 250 controls operations of the starter 120, the clutch pedal 210, the clutch controller 220, the state detector 230, and the output unit 260, which are components of the vehicle.

The vehicle controller 250 receives vehicle status data from the status detecting unit 230. The vehicle controller 250 may enter coasting running based on the vehicle status data. The vehicle controller 250 determines whether the position of the accelerator pedal included in the vehicle status data is equal to or greater than the acceleration reference value. Here, the acceleration reference value may be a predetermined value as a reference value to determine the acceleration will of the driver. The acceleration reference value may be set through a predetermined algorithm (e.g., program and probability model).

The vehicle controller 250 checks the status of the Ignition lock switch 215. In the case of a button starting vehicle, the vehicle controller 250 receives the state of the Ignition lock switch 215 from the SMK (Smart Key, not shown) through the vehicle communication network. In the case of a key starting vehicle, the vehicle controller 250 may receive a state of the Ignition lock switch 215 from a clutch pedal 210 through a pin to pin method.

The vehicle controller 250 receives the state of the Ignition lock switch 215 and generates switch status data based on the state. In the instant case, the switch status data may represent a state in which the Ignition lock switch 215 is turned on or off.

The vehicle controller 250 receives the clutch status data from the clutch controller 220 through the vehicle communication network.

The vehicle controller 250 may restart the engine 110 according to the clutch status data from the clutch controller 220 and the switch status data provided from the clutch pedal 210 when the position value of the accelerator pedal is equal to or greater than the acceleration reference value.

For the present purpose, the vehicle controller 250 may be implemented with at least one microprocessor operating by a predetermined program, and the predetermined program may include the steps included in the engine starting control method of the vehicle according to the exemplary embodiment of the present invention described below. It may include a series of instructions to perform. This vehicle controller 250 refers to FIG. 3, will be described in more detail.

The output unit 260 outputs warning notice data. This alert notice data may include telling the driver to step on the clutch pedal 210.

The output unit 260 is irrelevant as long as it can output warning notice data to the driver. For example, the output unit 260 may be a speaker that outputs the warning notice data as a voice or a display unit configured for displaying the warning notice data. The output unit 260 may include at least one of a navigation terminal, a cluster, a head-up display (HUD) and a communication terminal device of the driver mounted in the vehicle.

Here, the starter 120 may be various devices configured for starting the engine 110. For example, the vehicle may further include a mild hybrid starter & generator (MHSG) configured for starting the engine 110 or generating power by the output of the engine 110. When the MHSG is provided, the vehicle controller 250 may restart the engine 110 by driving the MHSG.

Hereinafter referring to FIG. 3, the control method for starting of engine will be described.

Figure 3:
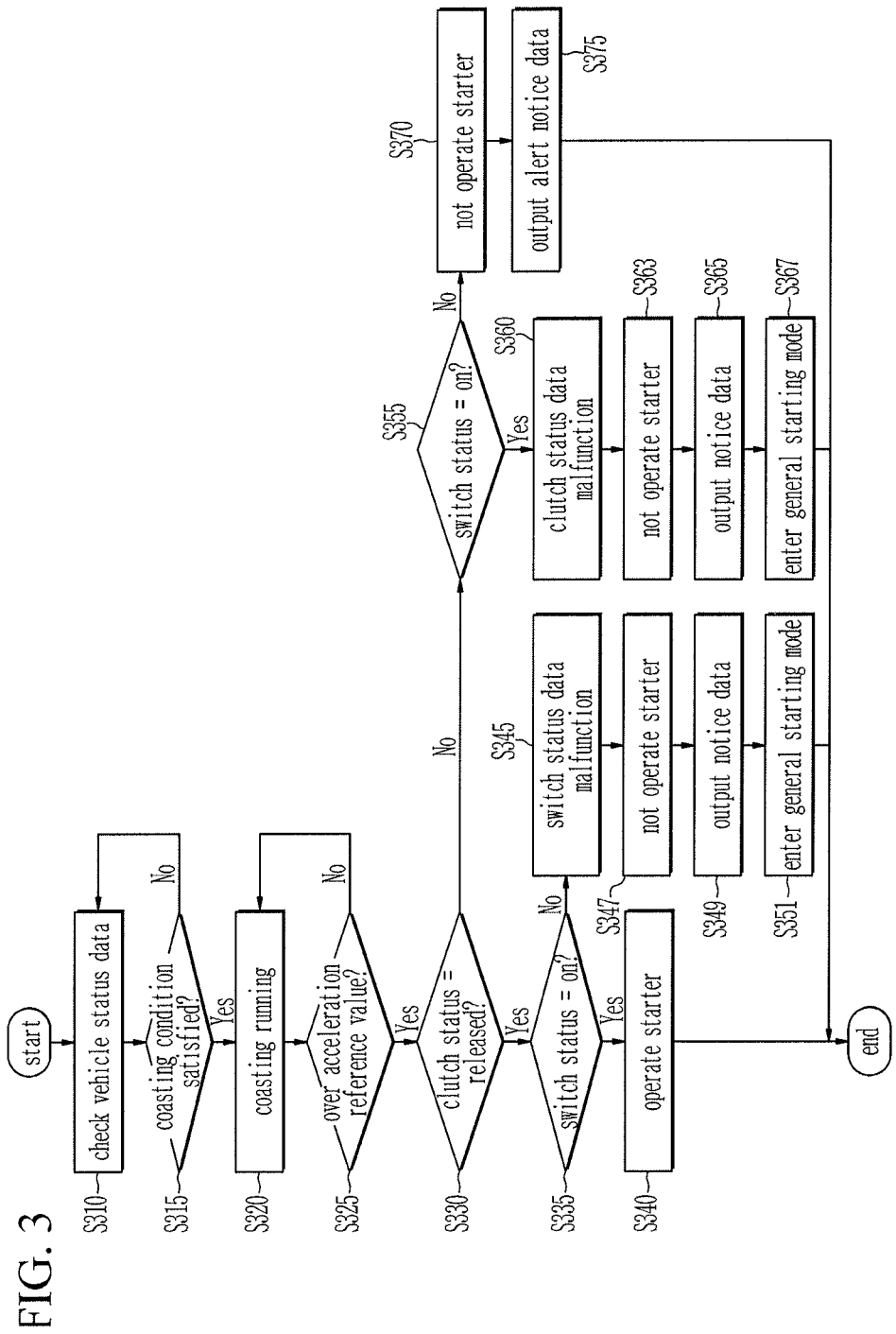
FIG. 3 is a flowchart illustrating a method for controlling starting of engine according to an exemplary embodiment of the present invention.

FIG. 3 is a flowchart illustrating a method for controlling starting of engine according to an exemplary embodiment of the present invention.

Referring to FIG. 3, the vehicle controller 250 checks vehicle status data for controlling the starting of an engine (S310). In the status detecting unit 230, the accelerator pedal position sensor 231 detects the position of the accelerator pedal, the brake pedal position sensor 233 detects the position of the brake pedal, the vehicle speed sensor 235 detects the speed of the vehicle, and the gear position sensor 237 detects the position of the gear lever. The status detecting unit 230 provides the detected vehicle status data to the vehicle controller 250, and the vehicle controller 250 checks the vehicle status data provided from the status detecting unit 230.

The vehicle controller 250 determines whether the coasting running entry condition is satisfied based on the vehicle status data (S315).

That is, the vehicle controller 250 may determine whether the coasting running entry condition is satisfied based on the position value of the accelerator pedal, the position value of the brake pedal, the vehicle speed, and the current gear stage.

For example, if the position of the accelerator pedal is a first predetermined value (e.g., 0%), the position of the brake pedal is a second predetermined value (e.g., 0%), the vehicle speed is above a predetermined vehicle speed, and the current gear shift is greater than or equal to a predetermined gear shift, the coasting running entry condition may be satisfied.

Here, the first predetermined value, the second predetermined value, the predetermined vehicle speed, the predetermined gear shift may be predetermined values, or may be predetermined values to determine whether the coasting running entry condition is satisfied.

Meanwhile, if the vehicle status data does not satisfy the coasting entry condition, the vehicle controller 250 returns to step S310 to check the vehicle status data.

The vehicle controller 250 drives the vehicle in coasting mode if the vehicle condition data satisfies the coasting running entry condition (S320). That is, the vehicle controller 250 generates a stop command to the engine 110 and generates a release command to the electronic clutch 140 when the vehicle status data satisfies the coasting running entry condition. With the coasting running in the state where the engine 110 and transmission 130 are disconnected, the travel distance of the vehicle may be increased to improve the fuel consumption of the vehicle.

The vehicle controller 250 determines whether the position value of the accelerator pedal is equal to or greater than the acceleration reference value (S325). That is, the vehicle controller 250 determines whether the position value of the accelerator pedal is equal to or greater than the acceleration reference value to detect the driver's acceleration intention.

Meanwhile, when the position value of the accelerator pedal is less than the acceleration reference value, the vehicle controller 250 returns to step S320 and controls the vehicle in coasting running.

The vehicle controller 250 determines whether the clutch status data is released (S330). In other words, the clutch controller 220 checks the status of the electronic clutch 140 and generates clutch status data. The clutch controller 220 provides clutch status data to the vehicle controller 250 via the vehicle communication network. The vehicle controller 250 receives the clutch status data from the clutch controller 220 and determines whether the clutch status data is released or coupled. In the instant case, the state of the clutch status data is released may indicate a state in which power delivery is not performed to the drive-wheel 135 because the driveshaft of the engine 110 and the driveshaft of the transmission 140 are not connected to each other.

If the clutch status data is released, the vehicle controller 250 determines whether the switch status data of the Ignition lock switch 215 is ON (S335). In other words, the vehicle controller 250 checks the switch status data of the Ignition lock switch 215 when the clutch status data is released. The vehicle controller 250 determines whether the switch status data is ON or OFF.

The vehicle controller 250 drives the starter 120 when the switch status data of the Ignition lock switch 215 is ON (S340). That is, the vehicle controller 250 drives the starter 120 to restart the engine 110 when the electronic clutch 140 is released and the ignition lock switch 215 is turned ON.

On the other hand, when the clutch status data is released and the switch status data is OFF, the vehicle controller 250 determines that the determination of the switch status data is a failure (S345). In the instant case, the vehicle controller 250 may enter the P-CODE and FAIL-SAFE mode after determining that the switch status data is determined as a failure.

The vehicle controller 250 controls the starter not to be operated 120 when the electronic clutch 140 is released and the ignition lock switch 215 is OFF (S347). For restarting the engine 110 the electronic clutch 140 may be released and the ignition lock switch 215 may be ON but the ignition lock switch 215 is OFF and thus the vehicle controller 250 does not drive the starter 120.

The vehicle controller 250 outputs notice data through the output unit 260 (S349). That is, the vehicle controller 250 outputs the notice data through the output unit 260 to inform the driver of restarting the vehicle through normal starting.

The vehicle controller 250 enters the normal starting mode (S351). In other words, the vehicle controller 250 determines the failure through the switch status data and checks the status data to restart. The vehicle controller 250 determines whether the normal starting condition is satisfied based on the status data. In the instant case, the normal starting condition may indicate a condition for starting after the vehicle stops. For example, when the position of the accelerator pedal is less than or equal to the first predetermined value (e.g., 0%), the position of the brake pedal is less than or equal to the second predetermined value (e.g., 0%), and the speed of the vehicle is the third predetermined value (e.g., 0 kph) or less, and the current gear stage is a predetermined gear stage (e.g., neutral stage), the normal starting condition may be satisfied The vehicle controller 250 drives the starter 120 when the status data satisfies the normal starting condition.

Meanwhile, when the clutch status data is coupled (engaged), the vehicle controller 250 determines whether the switch status data of the Ignition lock switch 215 is ON (S355).

If the clutch status data is coupled and the switch status data is ON, the vehicle controller 250 determines the determination of the clutch status data as a failure (S360). In other words, if the driver presses the clutch pedal 210 and the Ignition lock switch 215 is ON, but the electronic clutch 140 is engaged, the vehicle controller 250 may diagnose a failure of the clutch controller 220, which determines the status of the electronic clutch 140, or vehicle communication network. Thereafter, the vehicle controller 250 may enter the P-CODE and FAIL-SAFE mode.

Since the clutch status data is coupled and the switch status data is ON, the vehicle controller 250 determines that the failure occurs and then does not drive the starter 120 (S363). That is, the electronic clutch 140 may be released and the ignition lock switch 215 is ON for restarting, but the electronic clutch 140 is in a coupled state, and thus the vehicle controller 250 does not drive the starter 120.

Subsequently, the vehicle controller 250 outputs notice data through the output unit 260 that the vehicle is to start starting after stopping (S365).

The vehicle controller 250 enters the normal starting mode and drives the starter (S367). That is, the vehicle controller 250 determines whether the normal starting condition is satisfied based on the status data, and starts the engine 110 by driving the starter 120 when the status data satisfies the normal starting condition.

The vehicle controller 250 controls the starter 120 not to be operated when the clutch status data is combined and the switch status data is OFF (S370). That is, the vehicle controller 250 does not drive the starter 120 when the acceleration intention is detected from the driver in the coasting running state, but the electronic clutch 140 is coupled and the ignition lock switch 215 is OFF.

The vehicle controller 250 outputs warning notice data through the output unit 260 (S375). That is, since the electronic clutch 140 has not been released due to abnormal operation of the electronic clutch 140, the vehicle controller 250 may output warning notification data through the output unit 260 to notify the driver to step on the clutch pedal 210. Thereafter, the vehicle controller 250 may enter the P-CODE and FAIL-SAFE mode.

While the present invention has been described in connection with what is presently considered to be practical exemplary embodiments of the present invention, it is to be understood that the present invention is not limited to the included exemplary embodiments. On the other hand, it is directed to cover various modifications and equivalent claims as well as various alternatives and modifications thereof. It is intended that the scope of the present invention be defined by the Claims appended hereto and their equivalents."

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of controlling starting of an engine, the apparatus comprising:
    a clutch pedal including an ignition lock switch;
    a starter configured to start the engine;
    a status detecting unit configured to detect a vehicle status data for controlling a starting of the engine;
    an electronic clutch mounted between the engine and a transmission;
    a clutch controller configured to control coupling and releasing of the electronic clutch, check status of the electronic clutch and generate a clutch status data; and
    a vehicle controller configured to enter coasting running mode based on the vehicle status data, and, during the coasting running mode, operate the starter and restart the engine based on the clutch status data provided from the clutch controller and a switch status data of the ignition lock switch, upon determining that a position value of an acceleration pedal included in the vehicle status data is equal to or greater than an acceleration reference value.

2. The apparatus of claim 1, wherein the vehicle controller is configured to, during the coasting running mode, operate the starter to restart the engine, upon determining that the clutch status data includes a state in which the electronic clutch is released and the switch status data includes a state in which the ignition lock switch is ON.

3. The apparatus of claim 1, wherein the vehicle controller is configured to, during the coasting running mode, determine a status determination on the ignition lock switch to be abnormal upon determining that the clutch status data includes a state in which the electronic clutch is released and the switch status data includes a state in which the ignition lock switch is OFF.

4. The apparatus of claim 1, wherein the vehicle controller is configured to determine a status determination of the electronic clutch to be abnormal upon determining that the clutch status data includes a state in which the electronic clutch is coupled and the switch status data includes a state in which the ignition lock switch is ON.

5. The apparatus of claim 1, wherein the vehicle controller is configured to, during the coasting running mode, control an output unit to output an alert notice data upon determining that the clutch status data includes a state in which the electronic clutch is coupled and the switch status data includes a state in which the ignition lock switch is OFF.

6. The apparatus of claim 1, wherein the vehicle controller is configured to, during the coasting running mode, determine a status determination on the ignition lock switch to be abnormal upon determining that the clutch status data includes a state in which the electronic clutch is coupled and the switch status data includes a state in which the ignition lock switch is OFF.

7. A method of controlling starting of an engine of a vehicle including a clutch pedal having an ignition lock switch, a starter configured to start the engine, and an electronic clutch mounted between the engine and a transmission, the method comprising:
    detecting, by a status detecting unit, a vehicle status data for controlling a starting of the engine;
    operating the vehicle, by a vehicle controller, in a coasting running mode based on the vehicle status data;
    determining, by the vehicle controller, when a position value of an accelerator pedal is equal to or greater than an acceleration reference value during the coasting running mode;

upon determining that the position value of the accelerator pedal is equal to or greater than the acceleration reference value, determining, by the vehicle controller, when a clutch status data of the electronic clutch includes a state in which the electronic clutch is released;

upon determining that the clutch status data includes the state in which the electronic clutch is released, determining, by the vehicle controller, when a switch status data of the ignition lock switch includes a state in which the ignition lock switch is ON; and upon determining that the switch status data includes the state in which the ignition lock switch is ON, operating, by the vehicle controller, the starter to restart the engine.

8. The method of claim 7, further including:

after the determining that the switch status data includes the state in which the ignition lock switch is ON, determining, by the vehicle controller, a status determination on the ignition lock switch to be abnormal; and controlling, by the vehicle controller, the starter not to be operated.

9. The method of claim 8, further including:

after the controlling the starter not to be operated, controlling, by the vehicle controller, an output unit to output a notice data;

determining, by the vehicle controller, when a predetermined starting condition is satisfied based on the vehicle status data; and operating, by the vehicle controller, the starter to restart the engine upon determining that the predetermined starting condition is satisfied.

10. The method of claim 7, further including:

after the determining that the clutch status data includes the state in which the electronic clutch is released, upon determining that the clutch status data includes a state in which the electronic clutch is coupled, determining, by the vehicle controller, when the switch status data includes the state in which the ignition lock switch is ON;

upon determining that the switch status data includes the state in which the ignition lock switch is ON, determining, by the vehicle controller, that a status determination on the electronic clutch is abnormal; and controlling, by the vehicle controller, the starter not to be operated.

11. The method of claim 10, further including:

after the controlling the starter not to be operated, controlling, by the vehicle controller, an output unit to output a notice data;

determining, by the vehicle controller, when a predetermined starting condition is satisfied based on the vehicle status data; and operating, by the vehicle controller, the starter to restart the engine upon determining that the predetermined starting condition is satisfied.

12. The method of claim 10, further including:

after the determining that the switch status data includes the state in which the ignition lock switch is ON, upon determining that the switch status data includes a state in which the ignition lock switch is OFF, controlling, by the vehicle controller, the starter not to be operated; and controlling, by the vehicle controller, an output unit to output an alert notice data.

* * * * *